Figure 1:
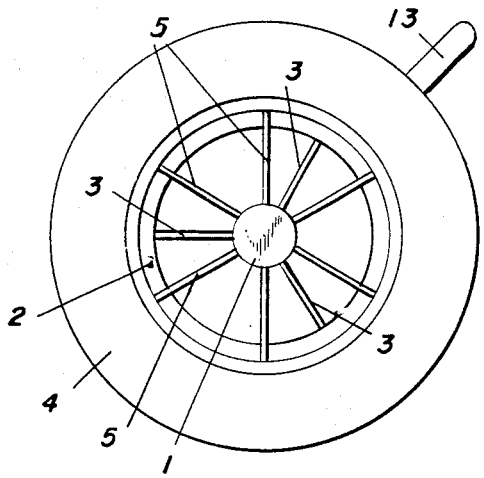

Sept. 11, 1956   A. BOUWERS ET AL   2,762,259
MICROSCOPE DIAPHRAGM HAVING AN
ADJUSTABLE OPAQUE CENTRAL PART Filed March 19, 1952   3 Sheets—Sheet 1

INVENTORS
ALBERT BOUWERS &
RUDOLF ZOGLMANN,

BY Wenderoth, Lind & Ponack
ATTORNEYS

FIG. 6
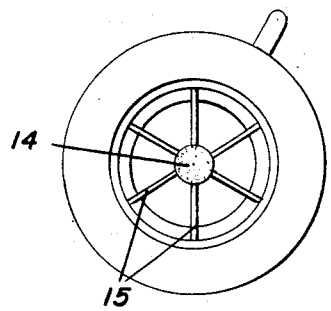
FIG. 7
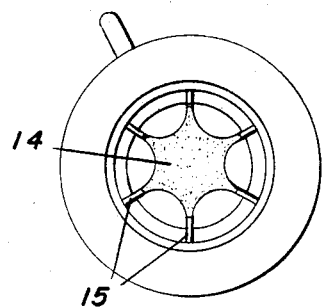
FIG. 8    FIG. 9
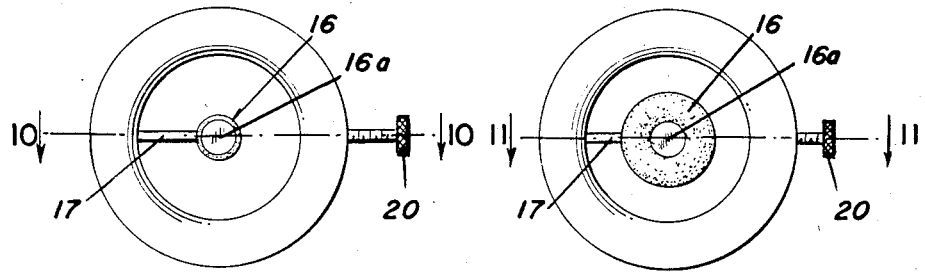
FIG. 10    FIG. 11
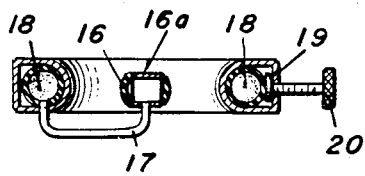
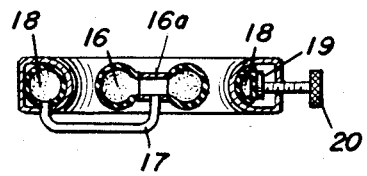
INVENTORS
ALBERT BOUWERS &
RUDOLF ZOGLMANN,

INVENTORS
ALBERT BOUWERS &
RUDOLF ZOGLMANN,

BY Wenderoth, Lind & Ponack

ATTORNEYS

United States Patent Office 2,762,259
Patented Sept. 11, 1956

2,762,259

MICROSCOPE DIAPHRAGM HAVING AN ADJUSTABLE OPAQUE CENTRAL PART

Albert Bouwers, The Hague, and Rudolf Zoglmann, Delft, Netherlands, assignors to N. V. Optische Industrie "De Oude Delft," Delft, Netherlands Application March 19, 1952, Serial No. 277,505

Claims priority, application Netherlands March 22, 1951

1 Claim. (Cl. 88—40)

It is a well-known method to provide microscopes with a diaphragm having an opaque central part. It is used, for example, in microscopes comprising a device for observation with phase contrast and in those which utilize catadioptric objectives according to the prior U. S. patent application, Serial No. 189,104, now Patent No. 2,656,761.

It has been found that the optimum size of the opaque part of the diaphragm aperture differs in each individual case, so that known devices comprising such a diaphragm have a limitation in that a given object cannot be observed under optimum conditions with regard to contrast and resolving power.

The applicant has found that this limitation may be obviated by providing a variable surface for the opaque central part. Thus, the operator can vary the size of the central part during observation, so that optimum conditions for observation can be created in an extremely simple, quick and efficacious manner.

An advantageous embodiment of the diaphragm according to the invention is that which comprises means by which the marginal zone of the opaque central part can be moved wholly or partly behind or in front of the central zone of this part. Thus, the surface of the opaque central part may be varied between a maximum and a minimum value. This embodiment has the advantage that in order to reduce the size of the opaque central part, the parts constituting the marginal zone of the said part have to be moved inside the inner circumference of the diaphragm aperture only. Thus, a continuous variation of the surface of the opaque central part may be carried out in a simple manner, which would not be the case if in order to reduce the size of this part, the parts of the marginal zone of the opaque central part would have to be moved outside the outer circumference of the diaphragm aperture.

A further embodiment of the diaphragm according to the invention has the feature that the adjusting mechanism is mainly arranged on the outer side of the diaphragm aperture. This construction has the advantage that more space is available on the outer side of the diaphragm aperture than in the area of the opaque central part.

A particularly advantageous embodiment is that in which the opaque central part comprises a number of blades which overlap one another wholly or partly and which can slide in their own planes. This has the advantage that the opaque central part can be increased or decreased by an extremely simple movement, i. e. by moving the blades along and over one another. According to the invention it is then advisable that the blades should be provided with members by which the blades are connected to the adjusting mechanism located on the outer side of the diaphragm aperture. According to the invention, the connecting members are preferably made slidable in stationary guides provided on the outer side of the diaphragm aperture. In this case it is advisable that the centre lines of the guides should be directed to the centre of the opaque central part. This implies that with the circular-symmetrical shape of the complete diaphragm, which is commonly used, the blades together with their connecting members can move only in radial direction.

In a favourable embodiment of the diaphragm according to the invention, the part of the connecting members which is located on the outer side of the diaphragm aperture comprises a lug, which is guided in a helix rotatable round the centre of the diaphragm. Consequently, when the helix is rotated, the connecting members will be moved either from the centre of the diaphragm or towards this centre, owing to the sliding connection with the helix. A different movement is not possible, owing to the stationary guides of the connecting members. The object aimed at is thus reached with simple constructional means.

It is desirable that the connecting members should intercept as little light as possible. According to the invention, this may be ensured by shaping the members in the form of strips and by arranging them in such a manner that the thin side of the strip is seen when looking in a direction at right angles to the plane of the diaphragm apertures.

In a further embodiment of the microscope according to the invention, two diaphragms are provided. One of them is of the type described above, the other being a conventional iris diaphragm. This combination yields the particular advantage that it is possible to vary both the outer and the inner diameter of the beams, which are assumed to be circular-symmetrical for the sake of simplicity, which contributes to an improved and easier observation. If the diaphragms are arranged in the vicinity of each other and each of them is provided with a lever, they can be readily operated by the fingers of one hand.

In order that the invention may be more clearly understood, Figures 1 to 5 inclusive show, by way of example, a diaphragm for use with the microscope according to the invention.

Fig. 1 is a front view of the diaphragm in the position in which the opaque central part 1 has its minimum size. In this case light is transmitted through the annular zone between the central part 1 and the ring 2.

The opaque central part is constituted by six movable disc-shaped blades and one stationary disc, all of the same size, which in the view of Fig. 1 are located exactly behind one another, so that they are not visible individually.

Figure 2:
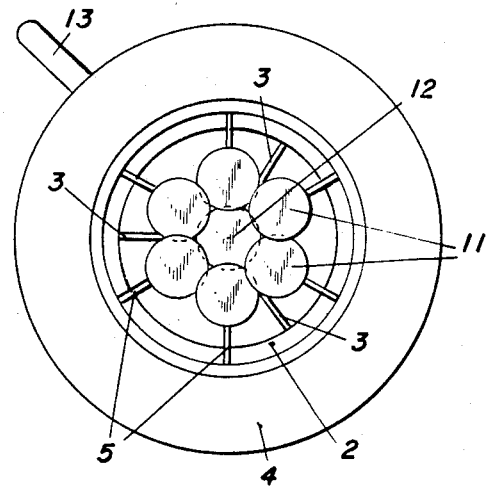

On the other hand, in Fig. 2, which is the same view in the position in which the opaque central part has its maximum size, the six movable blades 11 can be seen separately, the stationary disc 12 being shown in dotted lines. In this position the diaphragm consequently allows light to pass only through the aperture which is bounded by the ring 2 on the outside and by the six blades 11 on the inside.

Figure 5:
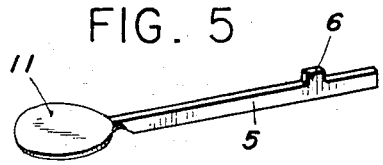

The stationary disc 12 is firmly secured to the diaphragm housing by means of three rods 3, arranged radially. Fig. 5 is a perspective view of one of the blades 11 with the strip-shaped rod 5 firmly attached thereto, which is provided with a lug 6. Each of the six blades 11 carries such strip-shaped rod with a lug. The six rods are visible in Figures 1 and 2 as the spokes of a wheel.

Figure 3C:
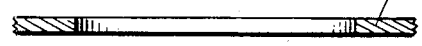
Figure 3B:
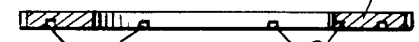
Figure 3A:
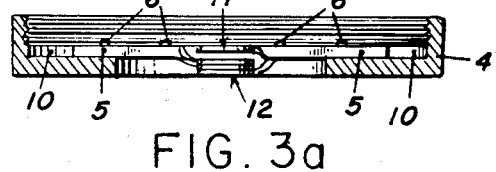

Fig. 3a is a sectional view of the housing of the diaphragm, in which two of the blades 11 with their rods and lugs are visible. The other blades and the stationary disc are left out of this figure for the sake of clearness.

Figure 4:
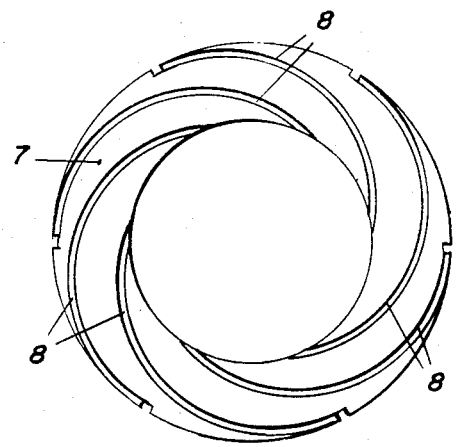

Fig. 3b is a sectional view of an actuating ring 7 and Fig. 4 is a front view of same. It may be seen therefrom that the ring 7 is provided with a number of helical grooves 8 which accommodate the lugs 6 of the rods 5, since the ring 7 is enclosed in the housing 4 of the diaphragm, by means of a threaded retaining ring 9, which is shown in section in Fig. 3c. The ring 7 then rests on the guide ring 2, which is firmly secured in the housing and which comprises six radial slots 10, the depth of which is equal to the height of the rods 5. The lugs 6 thus project above ring 2 and run in the grooves 8 of ring 7.

When ring 7 is turned, the lugs 6 are displaced in radial direction, since they run in the radial slots 10 and hence cannot perform a tangential movement. Displacement of the lugs 6 in radial direction results in the six blades 11 being moved inward or outward.

In order to ensure that the blades 11 and disc 12 can be arranged behind one another, each of them is arranged at a different height. From Fig. 3a it may be seen that the disc on the left-hand rod is arranged in a lower position than that on the right-hand rod.

The rods 5 are formed in the shape of strips and do not substantially intercept light in the direction of the light.

Ring 7 can be turned by means of a lever 13, shown in Figures 1 and 2. The connection between the lever and ring 7 is left out of the figure for the sake of clearness.

A microscope comprising a diaphragm as described above permits of taking a variable central part out of the active light beams by simple displacement of lever 13, in order to create optimum conditions during observation. The construction by which this is achieved is simple and efficacious.

It is self-evident that the diaphragm according to the invention can be realized in many other ways.

Some of the many alternative embodiments possible will be described with reference to Figs. 6–14, inclusive.

In the embodiment shown in Figs. 6 and 7, the central opaque part consists of thin sheet of elastic material 14. This sheet can be stretched by means of the rods 15 which are movable in radial direction, similarly to the rods 5 in Fig. 1. Therefore, the constructional features of the mechanism involved are not described once more. In Fig. 6 the central opaque part 14 is rather small, whereas in Fig. 7 said part is represented in its stretched position, in which its surface area has been considerably increased.

Figs. 8, 9, 10 and 11 represent another embodiment of the diaphragm according to the invention, whereby the central opaque part 16 consists of a balloon fixed onto a thin tube 17. The balloon has the shape of a disc, as the firm element 16a prevents the balloon from becoming a sphere. Said tube 17 is connected with the tire 18, which is shown in Fig. 10 and Fig. 11, representing a cross-section of the diaphragm shown in Fig. 8 and Fig. 9. The tire 18 can be pressed by means of the plate 19, which is operated by the screw 20. When said screw 20, shown in Fig. 10, is turned inwards, so that it arrives in the position represented in Fig. 11, the gas in the enclosed space of the tire 18, the tube 17 and the balloon 16 is compressed, resulting in an expansion of the baloon 16. Thus the required variations in the central opaque part is easily attained by operating screw 20.

Figure 12:
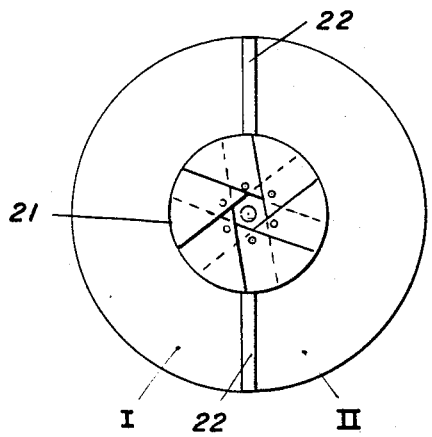
Figure 13:
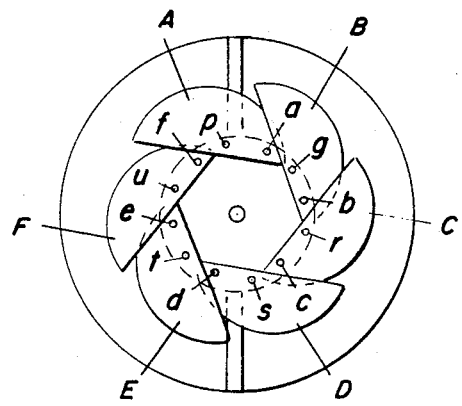
Figure 14:
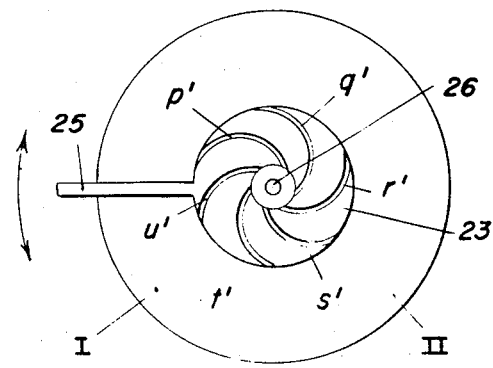

In the embodiment of the diaphragm according to the invention represented in Figs. 12, 13 and 14, the central opaque part is formed by a fixed plate 21 which is mounted by means of the fixed rods 22 to the outer side of the diaphragm house (not shown). Thus the diaphragm aperture consists of the two parts I and II. Six semi-circular blades A, B, C, D, E and F are pivoted to the plate 21 in the points $a$, $b$, $c$, $d$, $e$ and $f$ respectively. In Fig. 12 the blades can be seen in the position in which the central opaque part is as small as possible, whereas the blades are represented in Fig. 13 in their position yielding a large central opaque area. These blades are furthermore provided with the lugs $p$, $q$, $r$, $s$, $t$ and $u$ respectively.

In Fig. 14 is shown the aperature I—II and the plate 23, which is provided with the grooves, $p'$, $q'$, $r'$, $s'$, $t'$ and $u'$, and the lever 25. This plate 23 is rotatable about the axis 26.

When mounting the complete diaphragm, said plate 23 is positioned so that it is in the first place centered with respect to the fixed plate 21, whilst furthermore the lugs $p$, $q$, $r$, $s$, $t$ and $u$ are inserted in the grooves $p'$, $q'$, $r'$, $s'$, $t'$ and $u'$ respectively.

Thus, when lever 25 is operated, the plate 23 turns about axis 26 and the lugs $p$, $q$, $r$, $s$, $t$, and $u$ slide in their grooves $p'$, $q'$, $r'$, $s'$, $t'$ and $u'$ so that the blades A, B, C, D, E and F are rotated about $a$, $b$, $c$, $d$, $e$ and $f$.

We claim:

A microscope diaphragm with an opaque variable size central part comprising an interiorly threaded cylindrical housing having a closed end with an aperture centrally located therein, a guide ring positioned in said housing having a centrally located aperture therein, and a plurality of radially extending grooves, an apaque disc in the center of said guide ring aperture, a plurality of rods attached to said disc and said ring to support said disc, a plurality of opaque blades positioned above said disc, a plurality of strip-shaped rods attached to said blades and slidably engaged in said radially extending grooves and having lugs projecting upwardly from the edges opposite those engaged in said grooves, an actuating ring having a centrally located aperture and having a plurality of helical grooves, said actuating ring positioned on said housing with the grooves engaging said lugs, means to rotate said actuating ring in said housing and a retaining ring having a centrally located aperture threaded into said housing over said actuating ring.

References Cited in the file of this patent

UNITED STATES PATENTS 2,553,108    Osterberg et al. _____ May 15, 1951

FOREIGN PATENTS 10,879    Great Britain _____ of 1907
282,253    Great Britain _____ Dec. 22, 1927